Dec. 19, 1939.　　E. C. WHITNEY ET AL　　2,184,158
METHOD OF AND MACHINE FOR MEASURING
Filed Aug. 24, 1935　　11 Sheets-Sheet 1
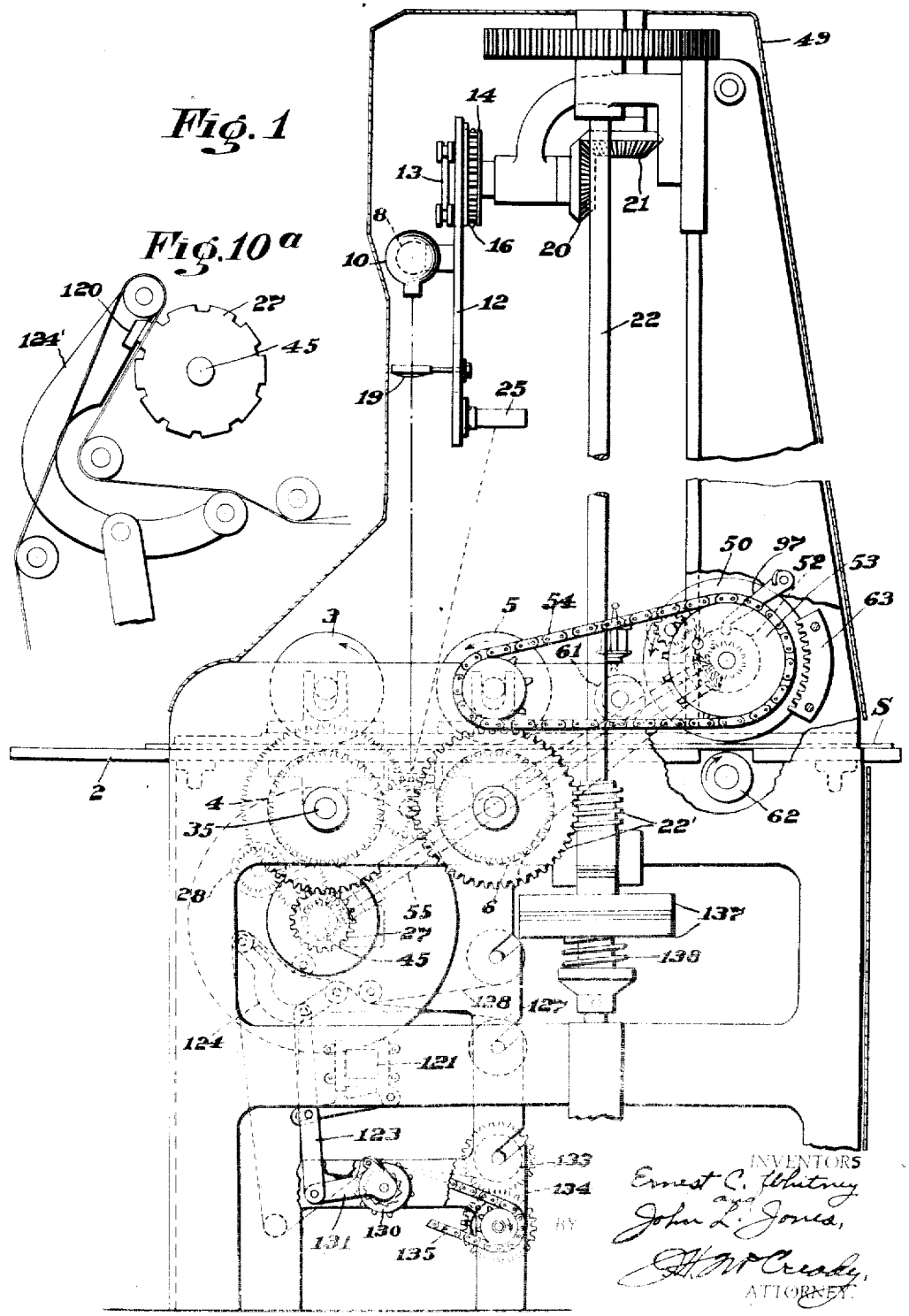

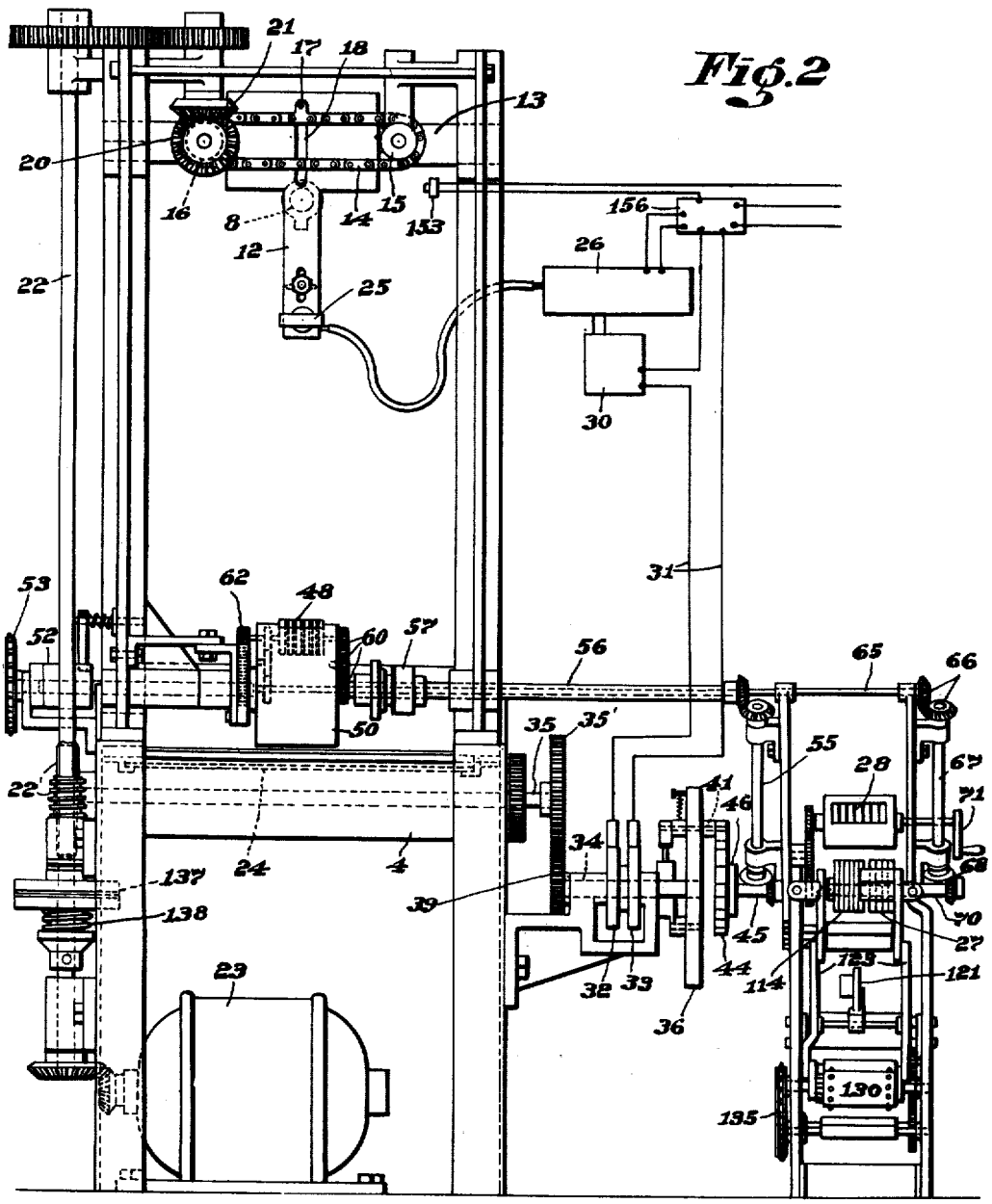

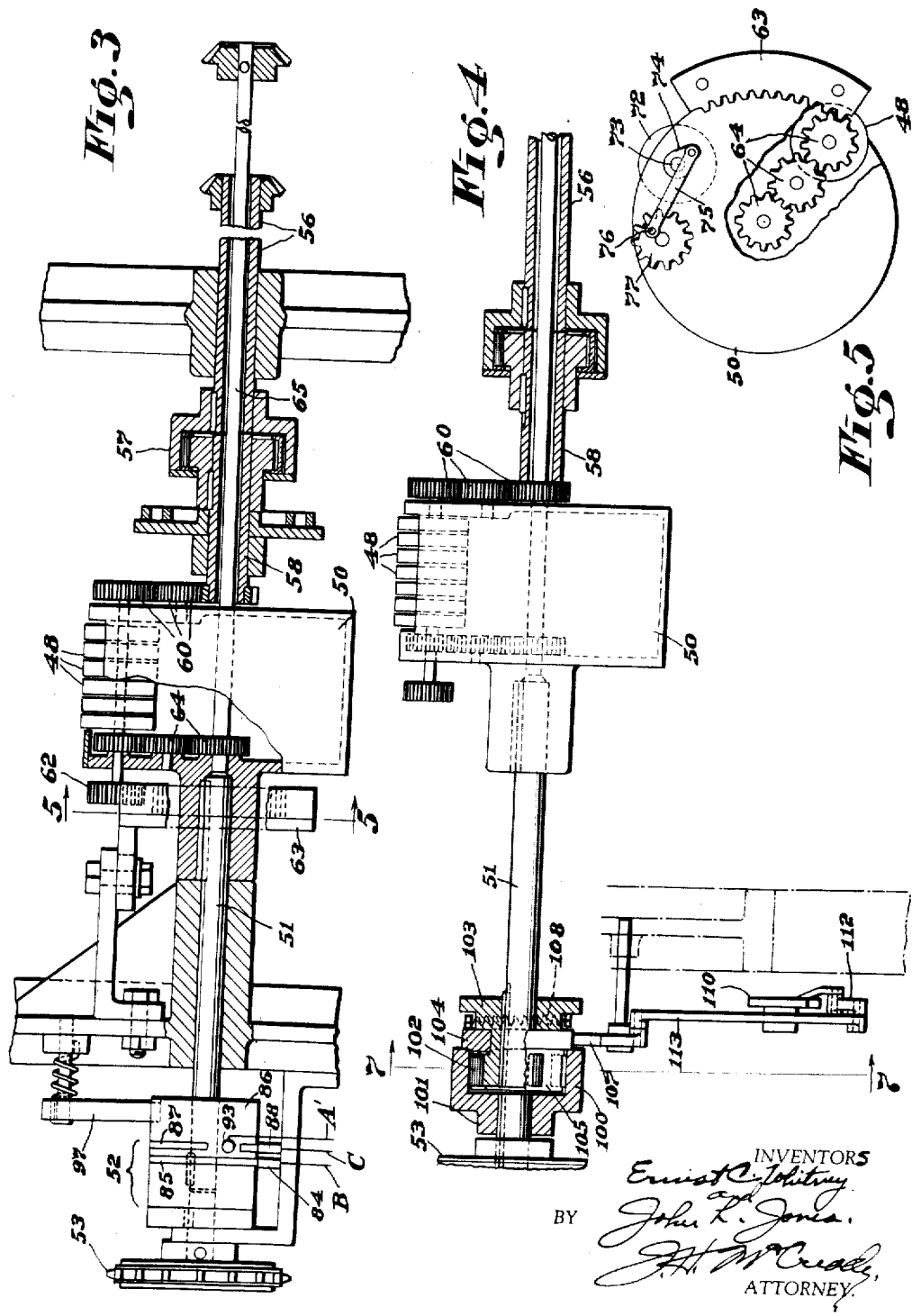

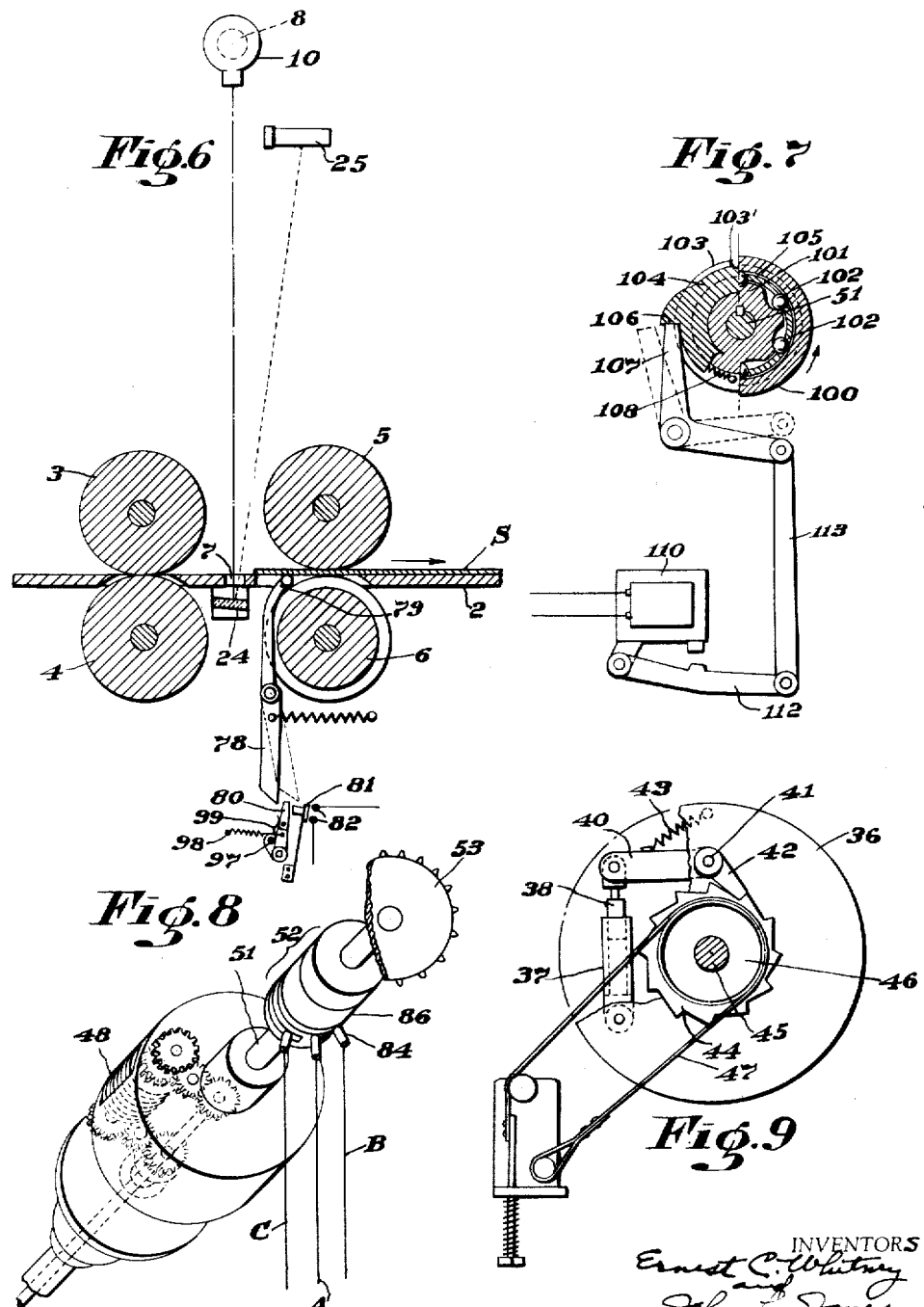

Dec. 19, 1939. E. C. WHITNEY ET AL 2,184,158
METHOD OF AND MACHINE FOR MEASURING
Filed Aug. 24, 1935 11 Sheets-Sheet 5
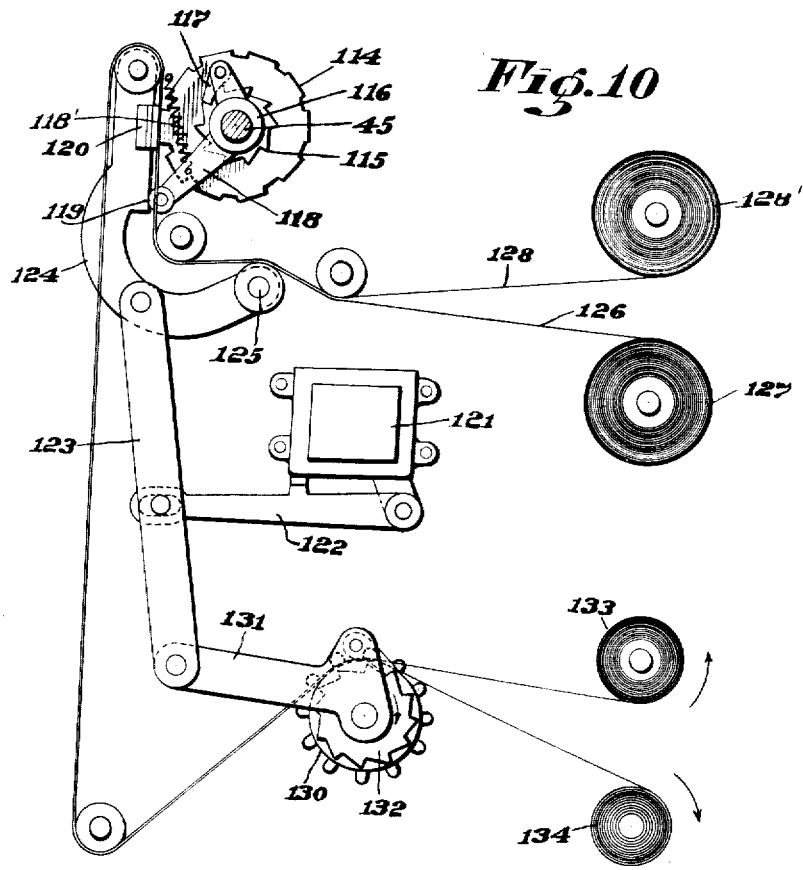
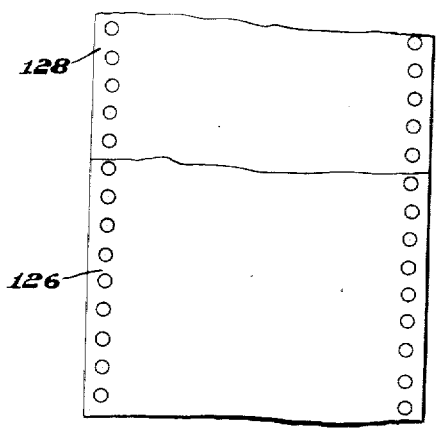
INVENTORS
Ernest C. Whitney
and John L. Jones
BY
ATTORNEY.

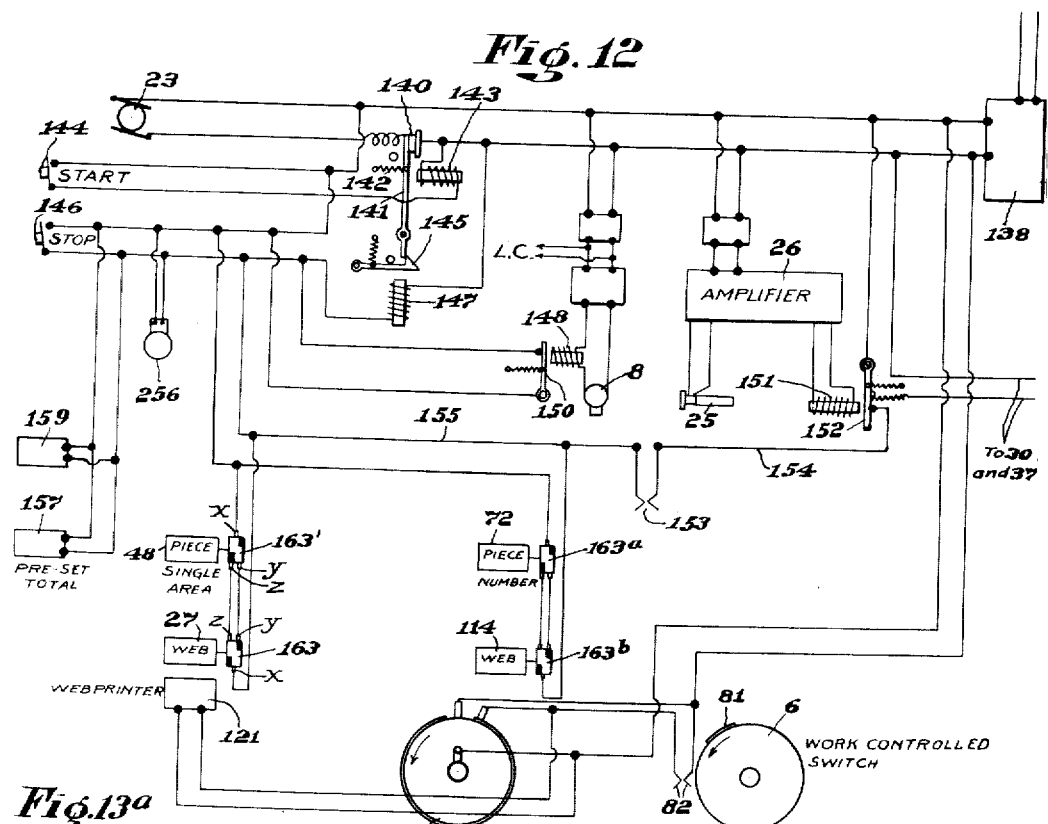
Fig. 12
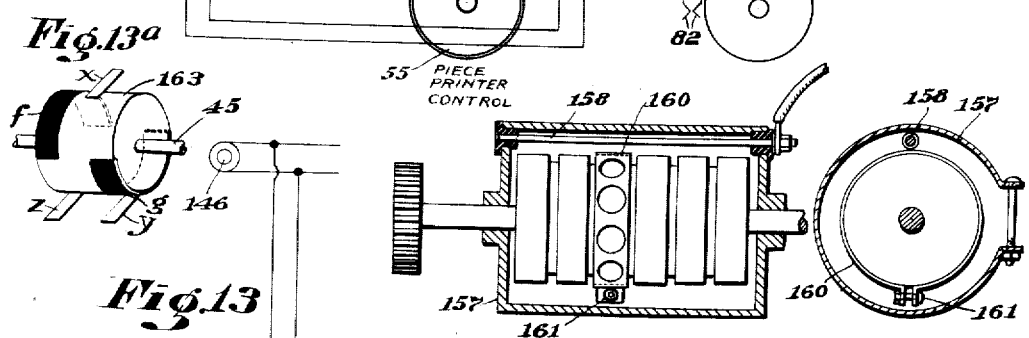
Fig. 13a  Fig. 13  Fig. 14  Fig. 15
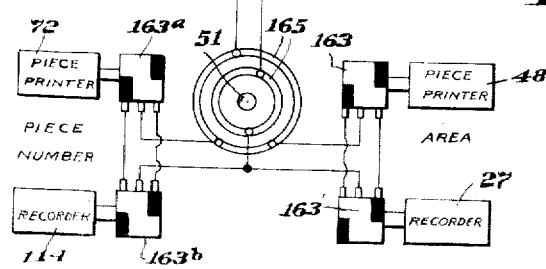

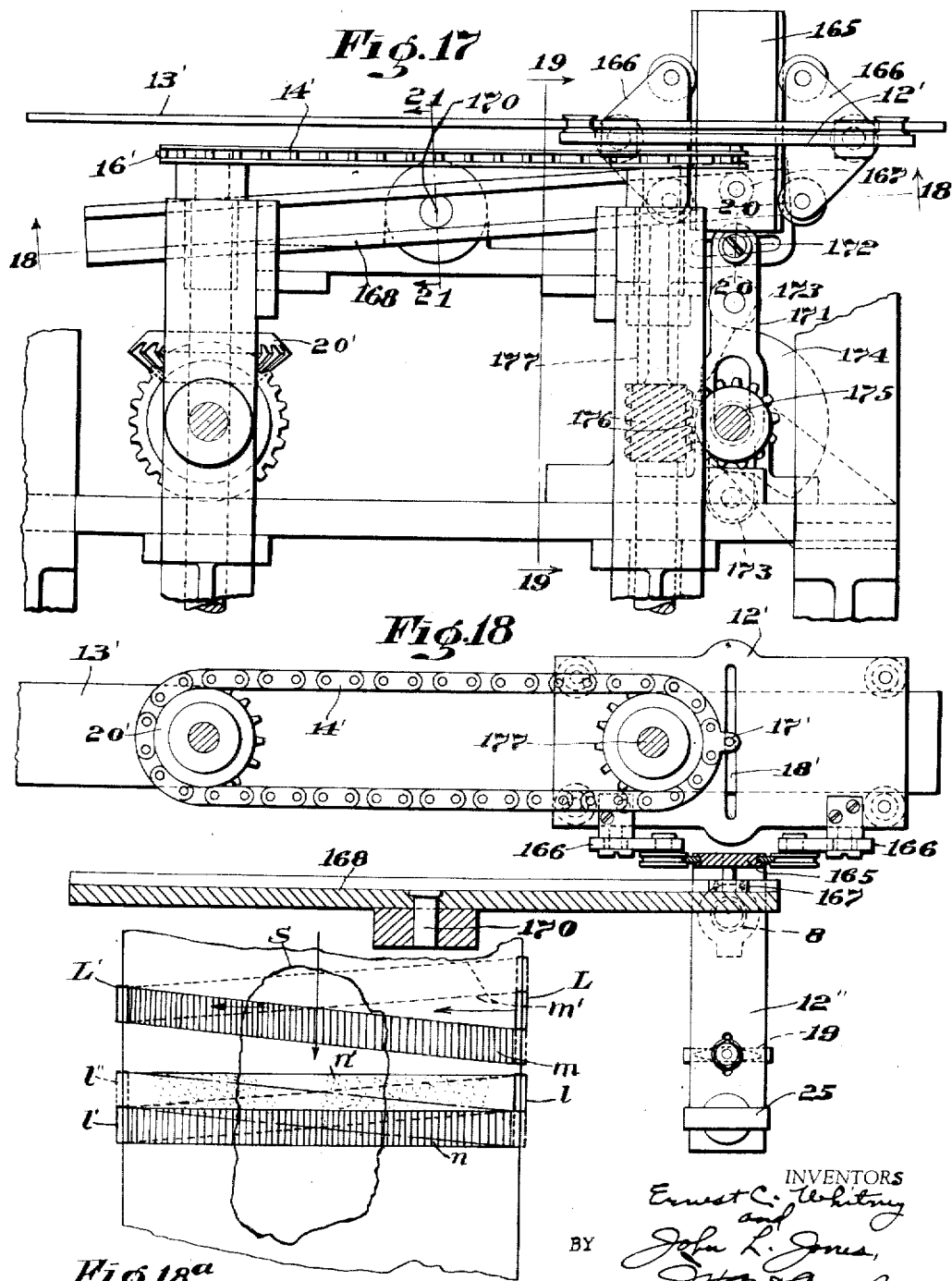

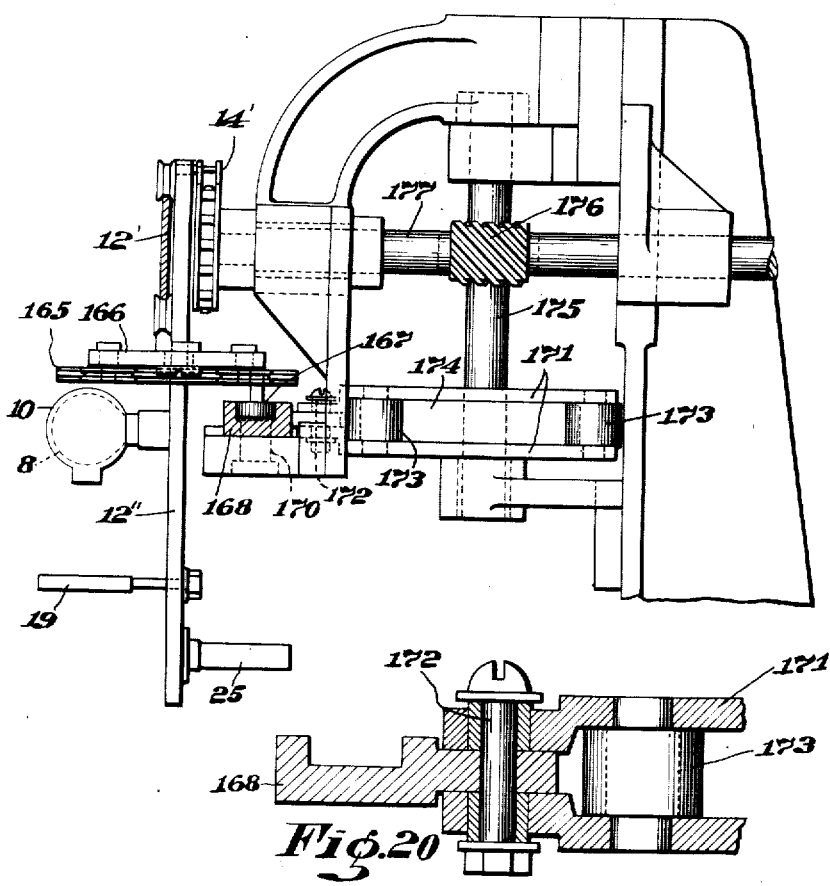
Fig. 19
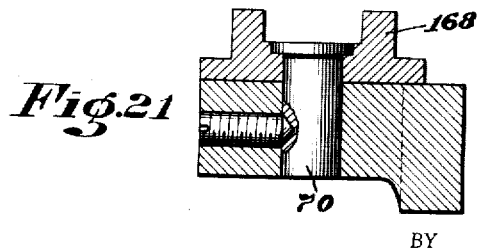
Fig. 20
Fig. 21

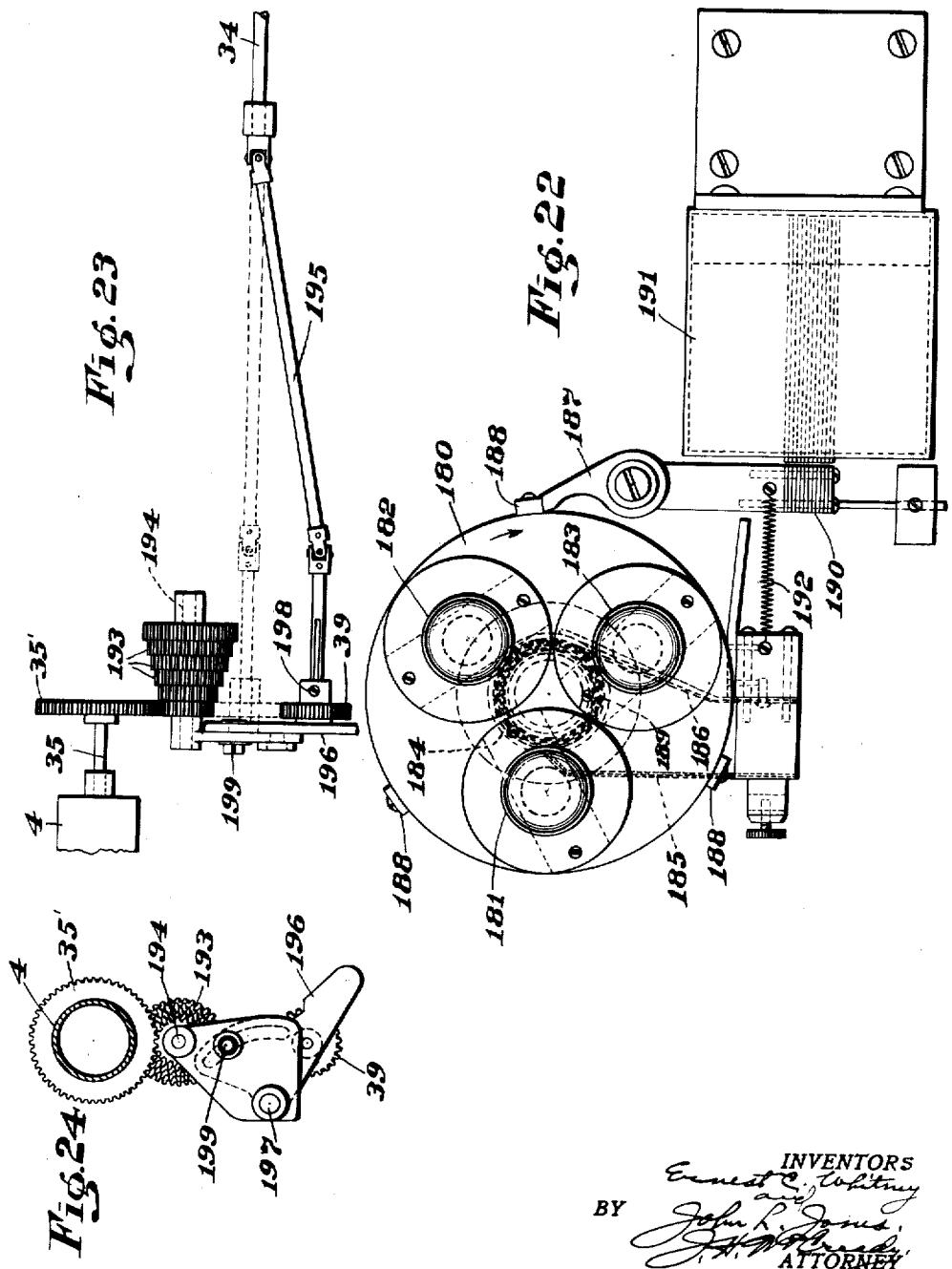

Dec. 19, 1939.  E. C. WHITNEY ET AL  2,184,158
METHOD OF AND MACHINE FOR MEASURING
Filed Aug. 24, 1935  11 Sheets-Sheet 11
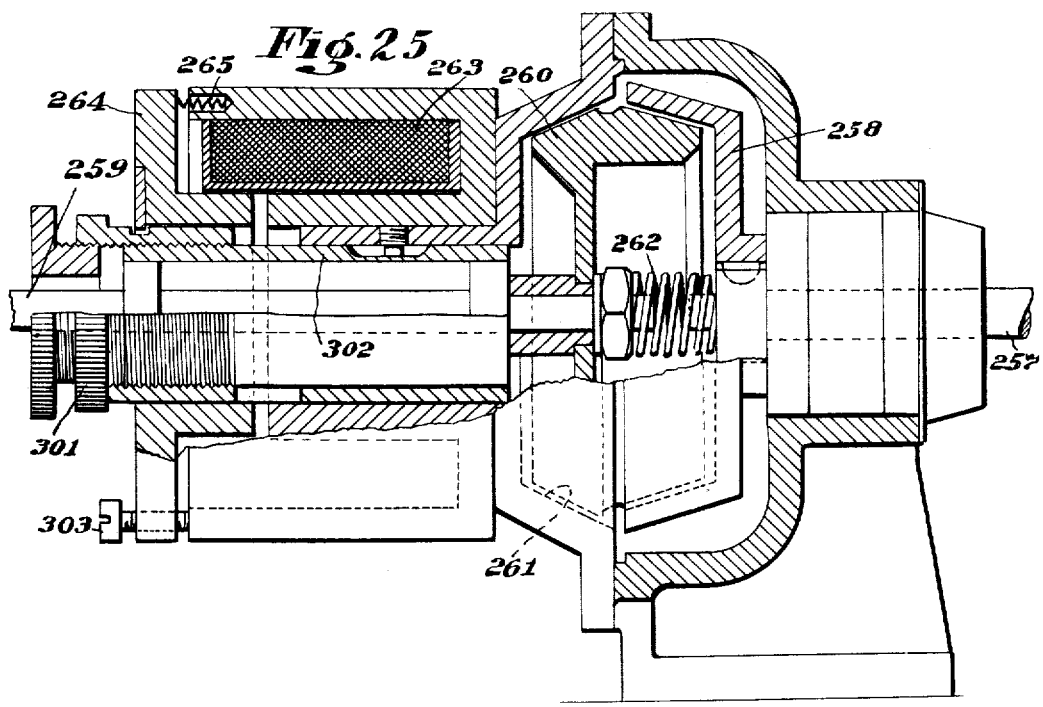
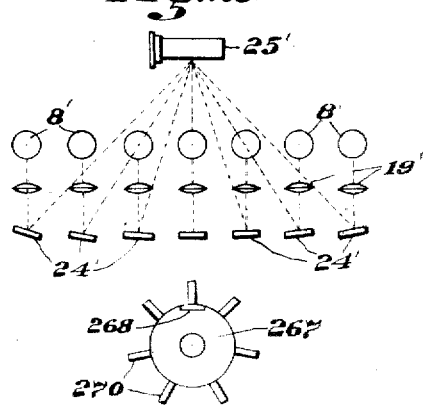
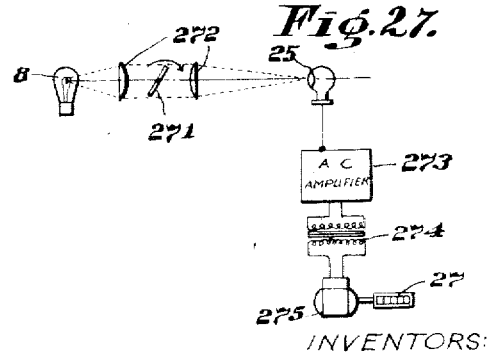
INVENTORS:
Ernest C. Whitney
John L. Jones
By E. H. McCrady
Attorney Patented Dec. 19, 1939

2,184,158

UNITED STATES PATENT OFFICE 2,184,158

METHOD OF AND MACHINE FOR MEASURING

Ernest C. Whitney, Danvers, and John L. Jones, Billerica, Mass., assignors to Stockton Profile Gauge Corporation, Lowell, Mass., a corporation of Massachusetts Application August 24, 1935, Serial No. 37,709

11 Claims. (Cl. 33—123)

This invention relates to methods of and machines for measuring quantities such as the areas of surfaces, more especially those having irregular outlines and which, therefore, are difficult to measure accurately, or others such as lumber, the measurement of which involves considerable labor. The invention also relates to the measurement of other quantities such as the volumes of solids.

Such methods and apparatus find an important commercial use in measuring the area of hides or leather, but they are also useful for a considerable variety of other purposes. The demand for them in measuring leather arises from the fact that a high proportion of the leather used in industry is bought or sold on an area basis. This applies particularly to the leather used in the manufacture of gloves, shoes, luggage, and various other products. Consequently, machines for performing such measuring operations are widely used in tanneries, shoe factories, and, in general, by the larger producers and users of leather.

Important objections to the present commercial machines of this character are their high first cost, their inaccuracy, and the fact that most of them, at least, involve a rather high labor expense in connection with their operation. The present invention is especially concerned with these factors and it aims particularly to overcome the objections just mentioned.

In addition, the invention is directed to the improvement of machines and methods of this general character with a view to enabling these area measurements to be made expeditiously on a wider variety of surfaces and with greater accuracy than has been possible heretofore, so that such methods can be used not only for commercial purposes but also in those scientific investigations in which the results of an experiment, test, or computation involves a plane surface having an irregular outline, the area of which must be determined with a high degree of accuracy, or a solid the volume of which must be determined.

The nature of the invention will be readily understood from the following description when read in connection with the accompanying drawings, and the novel features will be particularly pointed out in the appended claims.

In the drawings,

Figure 1 is a side elevation of a machine constructed in accordance with this invention;

Fig. 2 is a rear elevation of the machine shown in Fig. 1 with some of the parts of the machine removed;

Fig. 3 is a sectional view, partly in elevation, showing chiefly the mechanism for printing the area measurement on the work;

Fig. 4 is a similar view of another mechanism for performing the same function;

Fig. 5 is an end view of portions of the printing mechanism shown in Fig. 3;

Fig. 6 is a diagrammatic, sectional view through the feed rolls and adjacent parts, illustrating a portion of the controlling apparatus for the printing mechanism;

Fig. 7 is a sectional view approximately on the line 7—7, Fig. 4;

Fig. 8 is a perspective view of the printing mechanism shown in Fig. 3;

Fig. 9 is an end view of part of the controlling mechanism for the counter or indicator;

Fig. 10 is a diagrammatic view of the mechanism for printing the area and piece number indications on a record sheet or web;

Fig. 10a is a view of the upper portion of this apparatus illustrating a slightly different arrangement;

Fig. 11 is a plan view of the web on which the printing operation is performed and the carbon web cooperating with it;

Fig. 12 is a diagram of certain of the electric circuits;

Fig. 13 is another circuit diagram;

Fig. 13a is a perspective view of one of the commutator elements shown in Figs. 12 and 13;

Fig. 14 is a sectional view of one of the counters;

Fig. 15 is a transverse, sectional view of the device shown in Fig. 14;

Fig. 17 is a plan view of part of the mechanism for operating the scanning lamp;

Fig. 18 is a side view of parts of said mechanism;

Fig. 18a is a diagrammatic view showing different paths of travel of the scanning beam on the work;

Fig. 19 is a sectional view on the line 19—19, Fig. 17;

Figure 16:
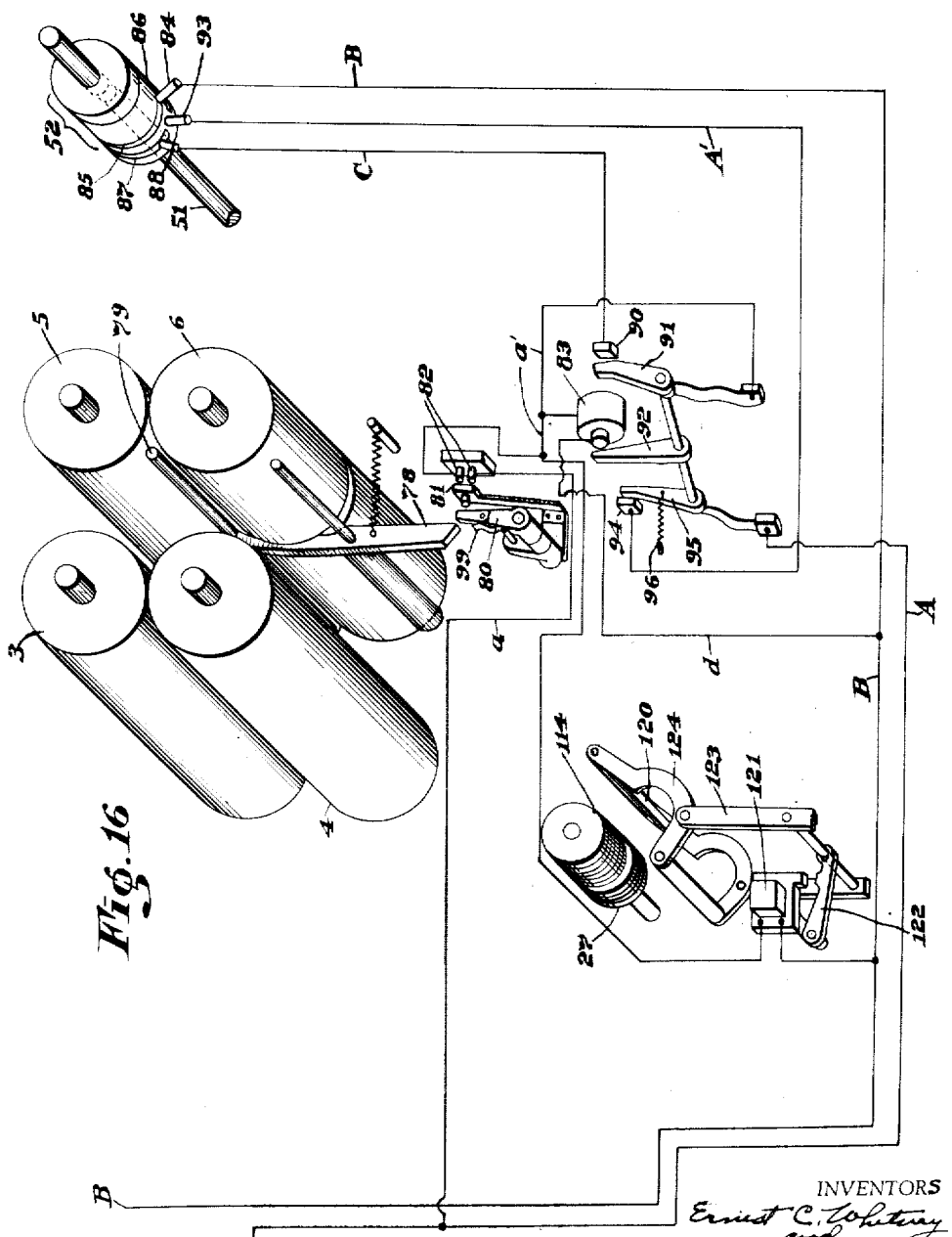
Fig. 16 is a circuit diagram of the controlling apparatus for the printing mechanisms.

Figs. 20 and 21 are sectional views approximately on the lines 20—20 and 21—21, Fig. 17;

Fig. 22 is a plan view of an automatic lamp changing mechanism which may be used in the machine;

Figs. 23 and 24 are side and end views, respectively, of the gear changing mechanism which may be incorporated in the machine;

Fig. 25 is a view, partly in side elevation and partly in section, of an electro-magnetic clutch which may be used in the machine instead of the ratchet mechanism shown;

Fig. 26 is a diagrammatic view of an alternative form of scanning mechanism; and, Fig. 27 is a diagrammatic view of an alternative arrangement for driving the counter.

Since an important commercial use of the invention is in the measurement of leather, tanned skins, and the like, the invention is here disclosed as embodied in machines adapted more especially for this purpose. The machines illustrated are designed to practice a method which may be described briefly as involving the steps of moving a beam of light, or other radiation to which a suitable radiation detector is responsive, across a known area, in which the surface to be measured is interposed, in such a manner as to scan increments of said area, and detecting and indicating or recording the number of such increments of area which are either covered or uncovered by said surface. The method thus determines the area of said surface directly or gives information from which such determination can readily be made.

It will be observed that in this method the area to be measured, or the known area in which the surface to be measured is interposed, may be considered as divided into a multitude of increments of area arranged in an orderly fashion convenient for scanning. In the case of the known area above referred to, the scanning operation detects the presence of those increments not covered by the work, and these increments are counted. Since the function of the scanning beam here is to determine whether successive increments are or are not covered, it obviously is not essential that the scanning beam cover the entire area of each increment. Assuming, for example, that these increments of area are represented by the spaces in coordinate paper, the beam may be made equal to the width of a row of these spaces and may sweep across the entire row, but it will perform essentially the same functions if it is considerably smaller than the width of such a row and sweeps across the center line of the row. In either event the beam will "scan" successive spaces in the row, and by using a suitable detector with it, it can be made to tell which spaces are covered by the work. The word "scan", therefore, is used herein to include the training of a radiation on a surface for the purposes here described, and the width of the strip whose area is to be determined by the travel of the radiation may be greater than the width of the radiation beam.

*Work feeding and scanning mechanism*

Referring first to Figs. 1 and 2, the machine there shown comprises a table 2 having a flat upper surface on which to support the skin or other material to be measured. Mounted in cooperative relationship to this table are upper and lower front feed rolls 3 and 4, respectively, Fig. 1, and a similar pair of rear feed rolls 5 and 6 operable to grip a skin and feed it across the table. All of these rolls are geared together and they may be driven from any suitable source of power.

Between the two sets of feed rolls the table 2 is provided with a long narrow slot 7, Fig. 6, extending parallel to the axes of the rolls and preferably of approximately the same length as the rolls. As the skin passes across this slot it comes into the path of the scanning beam of light issuing from an electric lamp 8 which is enclosed in a hood 10 provided with a suitable light tube. This lamp is mounted on a carriage or slide 12 arranged to reciprocate horizontally on a stationary track 13, the slide being provided with castors or rolls which grip the track and serve both to guide and support the slide.

For the purpose of imparting the desired reciprocating motion to the slide, a chain 14 is supported immediately beside it on suitable sprocket wheels 15 and 16 and this chain carries a roll or pin 17 that projects into a vertical slot 18 in the slide. Consequently, as the chain revolves, the pin or roll 17 moves the slide or carriage 12 backward and forward on its track. A positive driving connection is provided between the chain and the feed rolls which, in the particular arrangement shown, comprises a bevel gear 20 secured fast on the shaft of a sprocket wheel 16 and driven by another bevel gear 21, the latter being driven through suitable gearing and a vertical shaft 22 from an electric motor 23 which also drives the shaft of the feed roll 6 through worm gearing 22'. A lens 19, Fig. 2, is mounted adjustably on the carriage in line with the light tube to assist in controlling the beam of light.

With this arrangement, therefore, a relatively thin pencil or beam of light is swept across the entire width of the skin from one side thereof to the other simultaneously with the feeding of the skin a known distance through the machine. The rate of movement of the beam and the rate of feed of the skin may be so adjusted that the entire surface of the skin, or closely spaced strips only of said surface, may be scanned, as desired. As the beam travels from one end to the other of the slot 7, it will move part of this distance before it strikes the skin, will then cross the skin, and travel the remainder of its stroke out of contact with the leather, these operations being repeated on the return stroke. It will be evident that since the ratio of the rate of movement of the beam to the rate of feed of the skin is known, then, if the relative time interval during which the beam is on the skin is found, the area of the skin can readily be calculated. Or, since the beam reciprocates in a path of predetermined length and thus scans a known area during the feeding of the skin a given distance, then if the relative time that the beam is not intercepted by the skin is measured, the scanned area of the skin can readily be calculated. Either of these time determinations can be made in the machine shown. That is, provision is made in this machine for integrating the relative time intervals during which the beam is on the surface to be measured, or off it, as desired.

*Integrating mechanism*

For this purpose a reflector 24, Fig. 6, is mounted in the machine immediately below the slot 7 where it serves to reflect the scanning beam on to a photo-electric tube, photo-electric cell, or other suitable light sensitive device, all of such devices being hereinafter included in the term "photo-cell." This element is indicated at 25, and, as shown in the drawings, it is mounted on the carriage 12, where it travels with the source of light 8 and thus maintains a constant relationship to it.

As the scanning beam intersects the edge of the skin in moving in either direction, it produces an abrupt change in the flow of current in the circuit in which the cell 25 is connected. However, due to the fact that the currents handled by these photo-cells are relatively weak, it is convenient and often necessary to amplify the cell current in order to build it up to a value suitable for operating or controlling a counter or some other type of indicating or recording apparatus. As shown in Fig. 2, the cell circuit includes an amplifier 26, the nature of which necessarily will depend upon the requirements of different types and designs of machines, the nature of the photo-cell used, and other practical considerations.

The output current of this amplifier controls the operation of two counters, indicated at 27 and 28, respectively, Fig. 2, such control being effected through a relay 30 which may consist of an electro-magnetically operated switch for turning current on or off the conductors 31. These conductors run to brushes which bear on two slip rings 32 and 33, both secured fast on a shaft 34 which is geared to the shaft 35 that carries the lower rear feed roll 4. Also mounted on the shaft 34 is a disk 36, Figs. 2 and 9, carrying a solenoid 37 with which a plunger 38 is operatively associated, the latter being pivoted to the outer end of an arm 40, fast on a rock shaft 41, to which a pawl 42 also is secured. A spring 43 acts on the arm 40 in a direction tending to hold the pawl 42 in engagement with the teeth of a ratchet wheel 44 which is secured fast on another shaft 45 co-axial with the shaft 34. This arrangement forms, in effect, a magnetically controlled clutch through which a driving connection may be established between the shafts 34 and 35, when desired, and broken or interrupted whenever necessary. The two counting devices shown conventionally at 27 and 28 may be of any suitable type, the former being designed to give the relative measure or area of a single skin and the latter to give the total indication or area of any desired number of skins, as for example, the total in a batch or order. Secured on the shaft 45 is a brake drum 46, Figs. 2 and 9, arranged to be engaged by some cooperating relatively stationary brake element, such as the brake band 47, Fig. 9, to stop the rotation of the counter shaft 45 immediately upon the movement of the dog 42 out of engagement with the ratchet wheel 44.

When this machine is in operation and a skin is being fed through it, with the scanning beam traversing the slot 7, as above described, the action of the light on the photo-cell 25 will cause a current sufficient to actuate the relay 30 to be delivered by the amplifier so long as the scanning beam is not intercepted by the hide or skin. Assuming that the relay 30 holds current on the conductors 31 at this time, the solenoid 37 will be energized, thus holding the pawl 42 out of engagement with the ratchet wheel 44. While this condition obtains, therefore, the shaft 45 will remain stationary and neither of the counters will be operated. As soon, however, as the scanning beam strikes the skin, and it therefore is prevented from reaching the photo-cell, the current in the cell circuit will be cut down to a value so small that the relay 30 will open the circuit through the conductors 31, thus de-energizing the solenoid 37 and allowing the spring 43 to move the pawl 42 into engagement with the ratchet wheel 44. Thereupon the shaft 45 will begin to rotate with the shaft 34 which, as above stated, is positively connected with the feeding mechanism, so that at this time the counters will be driven in a constant and definite relationship to the rate of the feeding movement of the skin.

It will thus be evident that in this arrangement known increments of area are scanned in relative intervals of time, and consequently, each such time interval represents a definite area. The instrument 27 counts, and thus collects or integrates, the increments of area or the relative time intervals during which the scanning beam is intercepted by the skin being measured; and it may be calibrated to give the result directly in square feet, or in some other convenient unit of square measure. If, however, the solenoid 37 is made to operate in a manner reverse to that just described, or if the spring 43 and plunger 38 are so connected to the pawl 42 that the spring 43 holds this pawl out of engagement with the ratchet wheel 44 when the solenoid 37 is de-energized, then the counter will integrate the area increments or relative time intervals during which the scanning beam is not intercepted by the skin. By subtracting this result from the known scanned area in which the skin is interposed, or the total relative time required for the beam to traverse said area, the same result will be obtained as before. In either case the counter gives a result which bears a definite relation to the area of the skin being measured, and from that result the area in square feet, or other convenient unit of square measure, can easily be determined. When the subtraction method is used, the boundaries of the scanned area must include the entire skin.

It will be observed that the speed with which the counter will respond to the movement of the beam on or off the edge of the skin will depend upon the characteristics of the electrical elements, including the photo-cell, the amplifier, and the relays, and also upon such mechanical factors as the spacing of the teeth on the ratchet wheel and the speed at which the disk 36 is driven. The electrical system may be made to operate practically instantaneously, and the time interval required for the pawl 42 to pick up the ratchet wheel may be made extremely short by using a large number of teeth or revolving the disk 36 at a high peripheral speed. A magnetically operated friction clutch may be substituted for the positive clutch above described and may be controlled in the same manner as the latter clutch.

The machine above described may be regarded as a typical embodiment of the invention for the specific purpose of measuring the areas of skins, leather, and other materials which can be handled in essentially the same manner. It will be evident, however, that the general organization, as well as the details of construction, of such a machine necessarily will be varied in accordance with the nature of the material to be handled and other requirements of individual uses. In the particular machine shown, the beam of light is reciprocated in a fixed path and the skin is fed forward through this beam at right angles to said path. Such an organization has advantages from the standpoint of machine design, but the important consideration is the relative movement of the beam and the surface under examination, the specific means provided to produce this relative movement being less important and largely determined by the requirements of good engineering and correct machine design. Many other embodiments of the invention, all involving essentially the same principles, may be devised.

Mechanism for printing on the work

In addition to measuring the areas of individual hides, it is often desirable to print the area on the respective hides or skins. Also, for the purpose of keeping proper records, it is of advantage to number the hides as they go through the machine. This invention provides a mechanism for performing these operations. To this end a printing indicator or counter 48, Fig. 2, is arranged to be operated by the shaft 45 simultaneously with the operation of the area indicator or counter 27. As shown in Figs. 1, 2 and 3, the printing counter is carried by a drum 50 secured fast on the end of a shaft 51 which is connected through a single revolution clutch 52 with another shaft carrying a sprocket wheel 53 driven by a chain connection 54, Fig. 1, with the shaft of the upper feed roll 5. Normally the drum 50 is stationary. Both the counters 48 and 27 may be of the same type, similar in construction to the ordinary mileage indicator, the disks being numbered and operated, as above described, so that they will give their indications in square feet and tenths or hundredths of a square foot, or in square meters and decimals thereof. These disks or number elements in the printing indicator or counter 48 are operated by mechanical connections with the shaft 45, such connections including an inclined shaft 55, Figs. 1 and 2, driven from the shaft 44 through mitre gears, and, through a similar connection, driving a hollow shaft 56. The latter shaft is connected through a one-way clutch or ratchet 57, Fig. 3, with another shaft 58 which, in turn, operates through the gear train 60 to drive the disks of the counter 48 in the usual manner. At the completion of the measuring of each skin, but while the skin is still being fed through the machine, the printing cylinder 50 is given a single revolution by means that will be hereinafter described, thus causing the raised numbers on the counter 48 to be brought into contact with the surface of an inking roller 61, Fig. 1, and then into engagement with the skin S, the latter being backed up by the idle roll 62 opposite to the printing point.

After having printed the area on the skin, the cylinder 50 continues to revolve until it returns to its initial position where it automatically stops. During the latter part of this rotation, a re-setting gear 62, Figs. 2 and 3, comes into engagement wtih a stationary toothed sector 63, Fig. 1, which re-sets the counter 48. This mechanism is also utilized to re-set the area indicator or counter 27. For this purpose the re-setting gear is connected through the gear train 64, Fig. 3, with a shaft 65 extending through the hollow shafts 58 and 56 and connected through bevel gears 66 with an inclined shaft 67, Fig. 2, and through additional bevel gears 68 with the re-setting shaft 70 of the single area counter 27. The total area counter 28 may be re-set by turning the crank 71. Thus the two counters or indicators 27 and 48 which give the area of each hide are operated simultaneously by the same mechanism and are both re-set automatically at the conclusion of the measuring operation on each individual skin.

During this printing operation an error would be introduced into the indication given by the printing counter 48 due to its rotation around the innermost pinion of the gear train 60 if measures were not taken to avoid this result. For this purpose the ball or roller ratchet 57 is included in the connection between the shafts 56 and 58. This device functions as a ratchet or as a clutch of the overrunning type. The outer or driving member of this device is secured fast on the shaft 56, Fig. 3, while the inner or driven member is secured fast to the shaft 58, the arrangement being such that when the printing cylinder 50 revolves for the purpose of printing the skin and re-setting the counter, all of the gears in the train 60 remain stationary on their respective axes, the shaft 58 revolving with the innermost pinion of this train. Normally, however, both shafts 56 and 58 are connected together through the clutch 57 and rotate in unison.

In order to number the hides consecutively for record purposes, another counter, herein referred to as the "piece number counter", is mounted in the printing cylinder 50, as shown in Fig. 5. It may conveniently be of the same construction as either of the area indicators, consisting of a series of disks located side by side, one of these disks being shown in Fig. 5 at 72. All of these disks are mounted on a shaft 73 to which a crank 74 is secured, and the outer end of this crank is connected by a link 75 to an eccentric pin 76 projecting laterally from one side of a pinion 77. The initial setting of this piece number counter 72 may be at the No. 1 so that it will print this number on the first hide on which the first measuring and printing operations are performed. As the pinion 77 engages the re-setting sector 63 during the revolution of the printing cylinder, it will be given a single revolution by said sector and this movement will be transmitted to the counter 72 to move the latter ahead one unit, the counter thus being set to print the next succeeding number on the next hide.

The operation of the printing mechanism above described is under the control of the hide or skin being measured. For this purpose a spring actuated feeler 78, Figs. 6 and 16, is mounted closely adjacent to the rear feed rolls 5 and 6 and comprises a shank piece and a bar-like portion 79 lying parallel with and located just behind the bite of said rolls where it engages the skin or other article being measured. The bar 79 extends the entire length of said rolls. In Fig. 16 the mirror 24 and supporting means 2 (Fig. 6) for the skin between rolls 3—4 and 5—6, are omitted for clarity. Normally the feeler is held in a depressed position by its engagement with the skin. As soon, however, as the rearward edge of the skin passes out from between the feed rolls 5 and 6, the feeler is swung in a counter-clockwise direction by its actuating spring. It should be remembered that the measuring operation has been completed immediately prior to this time due to the fact that the trailing edge of the skin has moved out of the path of travel of the scanning beam and that, consequently, the area indicating operation has stopped. When the movement of the feeler just described occurs, its lower end strikes the upper end of a lever 80 which, in turn, engages a spring supported contact 81 and forces this element against two stationary contacts 82, all three of these contacts cooperating to form a switch. This switch controls the operation of an electro-magnet 83. Referring to Fig. 16, it will be seen that the two line conductors A and B supply current to the apparatus there shown, the former of these conductors being connected by the conductor a to one terminal of the switch and through it and the conductor a' to the solenoid, while the opposite terminal of the solenoid is connected through the conductor d to the other side B of the line. The latter line conductor also runs directly to a brush 84 which constantly engages a slip ring 85 on the magnetic clutch assembly 52 that controls the operation of the printing cylinder shaft 51, as above described and as shown in Fig. 3. This ring is embedded in a cylindrical insulating member 86 which is keyed to the shaft 51 and therefore is normally stationary. A second slip ring 87 is also mounted in this member 86, and a brush 88 bears on it, this brush being connected by the conductor C to the stationary contact 90 of a switch which includes a movable arm 91, electrically connected to the conductor a'. The switch arm 91 is mounted on the same rock shaft with an armature 92, located in cooperative relationship to the electro-magnet 83, so that when the latter is energized by the closing of the switch 81—82 it attracts the armature, thus closing the switch 90—91. The coil of the electro-magnet in the clutch 52 has its terminals connected to the slip rings 85 and 87 and consequently, as soon as the switch 90—91 closes, the magnetic clutch 52 is energized, a driving connection between the constantly driven sprocket wheel 53 and the shaft 51 thus is established, and the printing cylinder 50 begins to revolve. The lower end of the feeler 78 quickly passes out of contact with the arm 80 so that the switch 81—82 immediately opens again, thus de-energizing the electro-magnet 83. In the meantime, however, the magnetic clutch 52 has revolved far enough to bring a third brush 93 into engagement with the slip ring 87 and this brush is connected through the conductor A', Fig. 16, contact 94 and switch arm 95 to the line conductor A. Normally the switch 94—95 is held closed by a spring 96 so that as soon as the solenoid 83 is de-energized, the latter switch is closed, thus maintaining the magnetic clutch 52 in its operative or power transmitting condition. The printing cylinder 50 therefore continues to revolve until the brush 90 runs off the end of the slip ring segment 87 and into the gap on the insulating cylinder which separates the ends of the split in this ring. This interrupts the flow of current through the clutch circuits, de-energized the clutch, and stops the motion of the printing cylinder. A spring pressed dog 97, Fig. 3, thereupon drops into a notch in the cylinder 86 and assists in stopping the cylinder and the shaft 51 when these parts have made exactly one complete revolution.

It will thus be observed that the switch 90—91 simply performs the function of initiating the rotation of the printing cylinder but when this function has been performed the switch then is opened, and the necessary current thereafter is supplied to the clutch through the normally closed switch 94—95 and the brushes 93 and 84. When the switch 81—82 is first closed, however, these brushes, although both alive, cannot complete the clutch circuit due to the fact that the former is not in contact with its slip ring segment.

All of the foregoing operations take place in an extremely brief interval of time. The feeler 78 remains in its elevated position until its upper end is again engaged and depressed by the leading edge or another hide or skin S, at which time it is again swung into the position shown in Fig. 6. During this movement its lower end engages the upper end of the arm 80, which at this time is held against a stop 97 by means of a spring 98, but the tip of this arm has a jackknife engagement with the main body of the arm that permits it to swing in a counter-clockwise direction, Fig. 6, far enough to clear the feeler, after which this tip is again returned to its normal position by the leaf spring 99. The parts then are in position for a repetition of the operations above described when the measurement of another skin has been completed.

Figs. 4 and 7 show an alternative arrangement for controlling the operation of the printing cylinder 50. Here the magnetic clutch 52 is replaced by a mechanical clutch of the roller type comprising an outer sleeve 100, rotating continuously with the sprocket wheel 53, and an inner cam member 101 peripherally recessed to receive a series of rolls, certain of which are shown at 102. This cam member is keyed to the shaft 51 and has an integral collar portion 103 spaced axially of the shaft from the cam portion of the member. Between these two portions of the member it is grooved to receive a collar 104, arranged to have a limited rotating movement relatively to the parts 101 and 103, and this collar carries a retainer or controller 105 for the rolls 102.

Normally when the machine is in operation, the sleeve 100 revolves continuously in the direction indicated by the arrow in Fig. 7, but the retainer is held in a stationary position by the engagement of its shoulder 106 with the end of a stop lever 107, so that at this time it holds the rolls 102 in an idle position such that they cannot establish a driving connection between the parts 100 and 101. But mechanism under the control of the feeler 78 is provided to swing the stop 107 out of engagement with the shoulder 106 immediately after the completion of the area measuring operation on a hide, and when this occurs a spring 108, the opposite ends of which are connected, respectively, to the parts 103 and 104, immediately rotates the collar 104 far enough to move the rolls 102 forward in their recesses to such a position that they are pinched between the parts 100 and 101, thus establishing a driving engagement between these two members and initiating the rotation of the printing cylinder 50. Before this cylinder has made a complete revolution, the stop 107 drops back into its normal position, as shown in full lines in Fig. 7, so that at the completion of such revolution the shoulder 106 again strikes the end of this lever, thus causing the retainer 105 to move the rolls 102 back into their idle positions again and interrupting the driving connection through the clutch. The cylinder continues to revolve through a short arc, thus tensioning the spring 108 again and it is brought to rest by the dog 97 engaging a notch 103' in the collar 103 as in the construction illustrated in Fig. 3.

The mechanism for operating the stop lever 107 may conveniently consist of an electro-magnet 110, Fig. 7, connected into the circuit conductor a, Fig. 16, so that it will be momentarily energized when the switch 81—82 is closed by the feeler 78, as previously explained. Such energization lifts the lever 112, Fig. 7, and operates through the link 113 to actuate the bell crank lever of which the member 107 forms one arm.

*Permanent record printer*

In addition to printing the number of the hide and its area on each hide or skin measured, it is also desirable to make a permanent printed record of these items for office uses. For this purpose the area indicator 27 preferably is made with raised figures, similar to those used on type, so that it can be used in this printing operation. Also, a piece number counter 114, Figs. 2, 10 and 16, is mounted immediately beside the area indicator 27, and includes disks of the same general type as those in the latter indicator so that the readings given by both indicators can be printed simultaneously on the same web or sheet of paper.

Referring to Fig. 10, it will be seen that the disks of the piece number counter are mounted loosely on the shaft 45 and that the endmost disk has a ratchet wheel 115 secured to it and provided with ten teeth. Also loosely mounted on said shaft is a hub 116 carrying a spring pressed pawl 117 for engaging and actuating the ratchet wheel 115, this hub also having an arm 118 projecting radially from it and provided at its outer end with a roll 119 which is arranged to be engaged and actuated by the platen 120 of the printing mechanism. Normally the arm 118 is held upward against a fixed stop by a spring 118' and the actuating movement imparted to it by the platen 120 is sufficient to move the ratchet wheel 115 one tooth. Thus this mechanism can be used to count skins in the same way that they are counted by the piece number indicator 72 previously described.

The printing mechanism is under the control of the work governed feeler 78, Fig. 16. It includes an electro-magnet 121, Figs. 10 and 16, connected into a circuit controlled by the switch 81—82. When energized it lifts an armature 122 and operates through a pair of links 123 to rock the platen frame 124 upwardly, this platen being arranged to swing on the shaft 125 as a fulcrum.

The printing preferably is done on a web 126 of paper unwound from a supply roll 127 and guided by means of suitable rolls, as shown in Fig. 10, across the surface of the platen 120. A web of carbon paper 128 unwound from roll 128' is fed with the web 126, both webs having perforated margins, as shown in Fig. 11, to be engaged by pins projecting radially from the feed roll 130, Fig. 10. A lever 131 is pivoted to the lower end of one of the links 123 and carries a spring pressed dog for actuating a ratchet wheel 132, secured to the end of the feed roll 130, by means of which the two webs are fed together step by step through the mechanism, the webs being moved one step at each actuation of the platen 120 and being wound up on rolls 133 and 134, respectively, by winding mechanism driven through a chain and gear connection 135, Fig. 1, between the feed roll 130 and the rolls 133 and 134.

With this arrangement, therefore, the number of each skin is printed on the web 126 and opposite that number is printed the area of that particular skin. In place of the number, or in addition thereto, the device can be made to print designations such as letters, trade-marks, and the like. Thus a permanent record of the work performed by the machine is produced. More than one record may be made, if desired, by feeding a plurality of webs of paper simultaneously through the printing mechanism and properly associating a carbon with each web.

In addition to utilizing the indicators 27 and 114 for printing the respective skin areas and piece numbers on the web 126, these indicators may also serve to indicate visually the area of each piece and its number by so mounting them in the machine that the numbers giving these indications can readily be seen by the operator. This would be difficult in the arrangement shown in Fig. 1, but both the counter indicators and the platen frame 124 of the printing mechanism can readily be so arranged that this result can be obtained. Such an arrangement is illustrated in Fig. 10a. It is like that previously described except that the figures giving the area indication of a single piece or hide are alined with each other at the upper portions of the two indicators 27 and 114 where they may readily be seen by the machine operator, and the platen frame 124' is so shaped as to bring the platen into contact with this line only of figures. It should also be understood that a totalizing counter could be mounted on the shaft 45 directly at the end of the piece area indicator 27 where it would accumulate the indication given by the latter indicator and would print the total areas of all pieces on the web 126 simultaneously with the printing operation just described. This would simply involve additional counting disks at the end of the latter indicator, but they would not be connected with the re-setting mechanism, and consequently, would not be affected by the re-setting operation.

It may here be pointed out that in some cases, as for example in connection with the measuring of lumber, the printing operation will be performed without ink and will consist, in effect, of stamping or indenting the numerals in the wood. This and equivalent methods of marking the work will hereinafter be included in the term "printing."

Operation

The operation of the machine has been so fully explained in connection with the description of its construction, that nothing more than a very brief statement of operation is believed to be necessary. The hide or skin enters the machine between the front feed rolls 3 and 4. It passes across the slot 7 through which the scanning beam is constantly travelling backward and forward. The scanning operation proceeds in the manner above described and the scanned increments of area are integrated by the counting mechanisms 27 and 48, all of these operations taking place automatically. When the rearward end of the skin passes out from between the rear feed rolls 5 and 6, the work controlled feeler 78 is actuated and initiates both the piece printing and web printing operations. The skin then is discharged from the machine. In the meantime a new skin has been placed on the table and its forward edge has entered between the front feed rolls, the operations above described then being repeated.

Since the operation of the machine may be adversely affected by the presence of stray light, it is preferable to enclose the entire machine, or at least the upper part of it, in a hood or casing such, for example, as that indicated at 49 in Fig. 1. This casing may be provided with windows through which the indicators can be read. The casing is not shown in the other figures illustrating parts of this machine.

In order to avoid the mechanical limitations of such a driving mechanism as that illustrated in Figs. 2 and 9 for operating the counter, this mechanism may be replaced by an electro-magnetic clutch controlled and operated in the same manner as the mechanism previously described. Such a clutch construction is shown in Fig. 25. It comprises a drive shaft 257 with a driving disk 258 secured fast on it, the shaft being mounted in ball bearings. A driven shaft 259 is also mounted in ball bearings and is supported coaxially with the shaft 257. It carries a rotor 260. All of this mechanism is mounted within a stationary housing or casing and the rotor is provided with two conical surfaces, one of which is arranged to engage a complemental surface 261 on the housing and normally is held in contact with it by a spiral spring 262. Thus the surface 261 acts as a brake, and since there is no power tending to drive this shaft at this time, the rotor is held stationary. At one end of the casing is an electro-magnet comprising a stationary coil 263 and an armature 264 mounted at the end of said coil and normally held away from it by three coiled springs, one of which is shown at 265. This armature has a loose engagement with a sleeve 301 threaded on to the bushing 302 in which the ball bearings are mounted for supporting the shaft 259. When the coil 263 is energized, it moves the armature 264 toward the right, and this movement produces a corresponding movement toward the right of the bushing 302, together with the bearings mounted therein, the shaft 259 and the rotor 260. Adjusting screws, one of which is shown at 303, serve to limit the extent of this movement, and it is made of such an amplitude that the inclined surface at the right-hand side of the rotor 260 engages the driven disk 258 and establishes a driving connection between these two parts. This condition continues until the coil 263 is de-energized, at which time the spring 262 immediately moves the rotor 260 to the left and into contact with the brake surface 261, thus stopping almost instantly the rotation of the shaft 259. The coil 263 is connected to the leads 31—31, Fig. 2, when this mechanism is used in the machine shown in Figs. 1 and 2. At this time, also, the shaft 257 is connected to or takes the place of the shaft 34 and the shaft 259 is connected through a spline, or the equivalent, with the shaft 45 so that it drives the latter.

For the purpose of eliminating the momentum of the parts supporting the scanning lamp 8, a different scanning arrangement may be used, as illustrated in Fig. 26. Here a series of lamps 8' are arranged to direct their beams through the slit 7, Fig. 6, each lamp being equipped with a light tube and an individual lens 19'. Also each lamp has an individual reflecting mirror 24', and the angles of the respective mirrors are made such that they all reflect their beams upon the surface of the same photo-cell 25'. These lamps are lighted in rotation through a revolving commutator 267. A single contact 268, carried by the commutator, engages successively the brushes 270, each brush being connected to one of the lamps 8' so that each lamp is illuminated only during the instant in which its respective brush is engaged by the contact 268. Any desired number of lamps may be used, and their beams may be so controlled that they pass through adjacent or adjoining sections of the slot 7, the result from a scanning standpoint being the equivalent to that produced by the reciprocation of the lamp 8 in the manner previously described.

In the arrangement above described a direct current amplifier has been used. It is equally possible to make use of an alternating current amplifier, in which case some provision must be made for interrupting the light beam striking the photo-cell 25. This may be conveniently accomplished in several ways, one being illustrated in Fig. 27, in which the beam reflected on to the photo-cell from the scanning lamp 8 is interrupted by a light chopper 271. Such a chopper may consist simply of a plate revolving on its own axis and at a constant speed. Lenses 272 may be used in conjunction with the light chopper to assist in controlling the beam. The electrical output of the cell is increased or amplified in the alternating current amplifier 273.

One advantage of using an alternating current amplifier is that it makes it possible to use a synchronous motor of the type designed for clock work to operate the counter 27. Such an arrangement is shown in Fig. 27 in which a self-starting synchronous motor (of which the Telechron clock motor is a good example) is shown at 275, this motor being connected to the amplifier through the output transformer 274. It is assumed that the light chopper 271 is driven at such a speed as to give the frequency required by this motor. This makes a very convenient and simple drive for the counter, the motor being controlled automatically by the photo-cell.

*Safety devices and automatic stop mechanisms*

A series of safety devices and stop mechanisms are desirable in order to take care of emergency conditions and to prevent the operation of the machine when some part fails to function properly and when, consequently, a wrong indication would be given if some means were not provided to prevent it.

For example, the work may be so fed into the machine, or may be of such a nature, that it will jam and either stop feeding, or will feed at an abnormally slow speed compared with the speed of travel of the scanning beam. In order to prevent damage to the machine under such circumstances, an overload friction clutch 137, Figs. 1 and 2, is included in the driving connections between the motor 23 and the first set of feed rolls. This clutch consists of two disks, suitably lined, and pressed together by a spring 138. If the load transmitted through this clutch exceeds a value predetermined by the pressure exerted by the spring, then the clutch will slip. The clutch is so designed and adjusted that it will cease to drive before damage occurs to any of the mechanisms driven through it.

Preferably, also, an automatic overload circuit breaker 138, Figs. 1, 2 and 12, which may be of any one of the common commercial types, is connected into the supply circuit for the motor 23, so that if a jam or an abnormally slow rate of feed of the work occurs, the added load so placed upon the motor will operate the circuit breaker and shut down the machine automatically.

Fig. 12 shows diagrammatically several additional automatic stop or safety devices. As there illustrated, the supply line for the motor 23 leads through a remote control switch 140, this switch comprising a pivoted arm 141 with a spring 142 acting upon it in a direction tending normally to hold the switch open. Opposing this spring is an electro-magnet 143, the circuit for which is connected across the supply line through a starting switch 144 which may be of the push button type, or any other convenient form. Consequently, in order to start up the motor it is simply necessary to push this button 144, whereupon the switch 140 will be closed. A spring actuated dog 145 engages the lower end of the switch arm 141 and holds the switch closed.

Also associated with this switch is a stop circuit connected directly across the supply line through a stop switch or button 146, and this circuit includes an electro-magnet 147 which, when energized, retracts the dog 145 and thus allows the spring 142 to open the switch 140.

The starting button 144 must be operated manually, but the stopping circuit may be closed either manually through the operation of the button 146 or automatically by any one of several arrangements presently to be described.

For example, the scanning lamp 8 is connected across the supply circuit through suitable apparatus, and an electro-magnet 148 is connected in this circuit in operative relationship to a switch 150, in parallel with the stop button 146, and normally held closed by a spring. So long as the lamp remains in operative condition, the switch 150 will be held open, but if the lamp should burn out, the electro-magnet would immediately become de-energized, the switch 150 would close, thus closing the stop circuit and shutting down the entire machine.

Likewise, if the amplifier 26 should fail, the machine should be stopped. As shown in Fig. 12, the output circuit of the amplifier supplies current to an electro-magnet 151 cooperating with a spring actuated armature 152 and a stationary contact to conduct current, when the electromagnet is de-energized, through a conductor 154, normally open switch 153, and an additional conductor 155 to the stop circuit. The switch 153 may be of the push-button type and it is so located that the button is struck by the reciprocating carriage 12 of the scanning device at the end of its reciprocating movement as indicated in Fig. 2. In this figure the casing 156 contains the parts 151—152, Fig. 12. When the machine is in operation and the photo-electric cell sees light reflected from the lamp 8, the electro-magnet 151 will be energized and will hold the switch 152 open. This condition always obtains at the end of the stroke of the scanning lamp because the beam at this time has passed off the work. Consequently, if the amplifier is working properly, the closing of the switch 153 at the end of the scanning stroke will not close the motor stopping circuit since the circuit through the switch 153 will be open at the switch 152. On the other hand, if the amplifier becomes inoperative, the latter switch will remain closed, and consequently, when the switch 153 is closed the stop circuit will be completed and the machine will be shut down.

In this connection it may be pointed out that it is desirable to use a self-braking motor at 23 so that it will stop quickly whenever the stop circuit is energized.

For some purposes it is desirable to have the machine stopped automatically when a predetermined number of skins have been measured, or the area measured has reached a predetermined total. An arrangement suitable for accomplishing this object is illustrated in Figs. 12, 14 and 15. It comprises a casing 157, which may be the casing of the total area indicator 28, the piece number counter 114, or any other counter. Through this casing runs a rod 158, insulated from the casing, and both this rod and the casing itself are electrically connected to the opposite sides of the stop circuit, as illustrated in Fig. 12. Normally no current flows through these connections. Fastened to any desired one of the counting disks of the indicator is a split clamp 160, the ends of which are bent outwardly and secured together by a bolt 161. This clamp is adjusted on the counter so that the bolt 161 lies directly over the number that will come up under the rod 158 when the desired total is reached. Consequently, when the counter turns up said number the bolt 161 will engage the rod 158, thus completing the circuit through this device, energizing the stop circuit, and shutting down the machine. A similar stop switch designed to operate when a predetermined number of hides has been measured is shown at 159 in Fig. 12.

It is important that both the piece printing area indicator 48 and the corresponding visual indicator 27, which likewise is used in this particular machine in the web printing operation, shall continuously give the same reading or indication. In other words, these two indicators must remain in synchronism. If they fall out of step it means that some error has occurred and that the machine, consequently, should be stopped until that error is corrected. The same is true of the two piece number indicators and printers 72 and 114. An arrangement which satisfies these requirements is illustrated diagrammatically in Fig. 12. As there shown, a commutator, of the construction better shown at 163 in Fig. 13a, is secured either on the shaft 45, as in Fig. 13a, or to the lowest number disk on the indicator 27, so that in either event the commutator 163 will be moved simultaneously with the latter disk. Another commutator 163' is similarly secured to the corresponding shaft or disk of the single area indicator and printer 48. As shown somewhat diagrammatically in Fig. 13a, three brushes $x$, $y$ and $z$ bear on the commutator 163, this element consisting of a cylinder of metal or other conducting material into the periphery of which two insulating segments $f$ and $g$ are set, each segment subtending an angle greater than 180°. The brush $x$ bears constantly on the portion of the cylinder between the segments $f$ and $g$, whereas brushes $y$ and $z$ engage either the surface of the cylinder or that of the segments $g$ and $f$, respectively. The connections of these elements to each other will be obvious from an inspection of Fig. 12. It will also be observed that the conductors connected to the brushes $x$—$x$ of the two commutators run to the opposite sides of the motor stop circuit so that the two commutators are connected in series and this series assembly is connected in parallel with the stop switch 146. As will be clear from the diagram, the arrangement is such that current can never flow through both commutators so long as they remain in synchronism. If, however, anything happens to make one commutator run slower than the other, or, in other words, if they ever get out of step, then current will immediately flow through both commutators, thus completing the stop circuit and shutting down the motor. The same arrangement of commutators 163 and 163b is used on the piece number counters 72 and 114, as also shown in Fig. 12.

A similar arrangement is shown in Fig. 13. It differs from that illustrated in Fig. 12 in two respects only; first, the current is conducted to all of the commutators through a pair of slip rings 165 mounted on an insulating collar secured to a shaft of the machine; and second, in this arrangement the three brushes for each commutator are located side by side instead of being arranged as shown in Fig. 12. The operation is the same in both constructions.

A gong 256 may be connected across the stop circuit where it will be operated whenever said circuit is closed.

It will be understood that the safety devices and automatic stop arrangements above described may or may not be used, as desired, and that whether or not they are used and the particular ones that are used, necessarily will depend upon individual preferences and the requirements of particular situations.

Compensating mechanism for scanner

Referring to Fig. 18a it will be evident that if the rectangle L be assumed to represent the area on the work illuminated by the scanning beam at a given instant, and that this rectangle moves in a direction at right angles to the direction of travel of the work, as in the construction above described, the actual path scanned by the beam in making a single stroke will be substantially like that indicated by the cross-hatched band m. The foregoing assumes that while the beam makes one stroke the work is fed a distance equal to the width of the scanned path. If now the beam makes a return stroke it will scan an apparent path designated by the dotted lines m'. It is clear that with this arrangement the scanning beam will describe a zigzag path on the work. At each stroke part of the area previously scanned will be scanned again and part of the work will not be scanned. For some measuring operations the error so introduced may not be an important factor and can be disregarded, but when greater accuracy is desired some means must be provided to compensate for or to prevent this error.

Referring to the lower part of Fig. 18a it will be seen that if, with the same conditions as before, the beam starts from the position l and moves in a straight line slightly diagonal to the direction of feed of the work to the position l' at the opposite side of the work, and the angle of this path is made such that while the beam moves across the work it travels with the direction of feed a distance equal to the travel of the work, then the path made by the beam on the work will be at exactly right angles to said direction of feed, as indicated by the shaded area n. If at the end of this scanning stroke the beam is moved in a direction opposite to the direction of feed of the work for a distance equal to the width of the scanned path (into the dotted position l'') and, starting from this point, the next stroke is made at an angle equal and opposite to that of the first stroke, then the area scanned on the second stroke will be a strip n' parallel to the strip n, of the same width as the latter, and contacting with the latter throughout its length. If these steps are repeated as the machine continues in operation, then the entire area of any article of work fed through the path of travel of the beam will be scanned and no part of said area will be scanned twice.

A mechanism designed to produce this result is illustrated in Figs. 17 to 21, inclusive. Here the holder 12'' on which the scanning lamp 8, condensing lens 19, and photoelectric cell 25 are supported is itself secured to a slide 165 and depends from the lower side of this slide. The slide is mounted for traversing movement transversely to the direction of reciprocation of the scanning lamp. It rides between two pairs of rolls carried by the respective brackets 166—166, both of which are secured to a slide or carriage 12' corresponding to the carriage 12 of the construction illustrated in Figs. 1 and 2 and arranged to be reciprocated in the same manner by a pin 17' projecting laterally from the chain 14'. Carried by and projecting downwardly from this slide is a roll 167 which runs in a groove of a channel bar 168.

As in the construction above described, the carriage 12' and lamp 8 are reciprocated at right angles to the direction of feeding movement of the work. In the present arrangement, however, the lamp 8 is also given an additional movement parallel to said direction of feed, the resultant of these two movements being a diagonal path of travel controlled by the channel bar 168. This bar is held in such a position as to compel the scanning beam to follow the diagonal path l—l', Fig. 18a, during one stroke. At the end of said stroke the channel bar 168 is swung to move the beam against the direction of feed of the work, as explained in connection with said figure, to cause it to make its return stroke in an oppositely inclined path. For this purpose the bar 168 is pivoted at 170 and a cam follower 171 is adjustably secured, as shown at 172, Fig. 17, to one end of the slide 165, this follower carrying two rolls 173—173 arranged to engage diametrically opposite points on a cam 174. This cam is mounted on a vertical shaft 175, driven through a spiral gear connection 176 with a horizontal shaft 177 which, in turn, is driven by the chain 14'. Said chain is operated through positive connections with the shaft 22, as in the construction previously described. The cam 174 is so timed that it holds the channel bar 168 in the position illustrated in Fig. 17 while the scanning lamp makes one complete stroke. It then shifts said bar into the oppositely inclined position before the lamp starts on its return stroke, holds it in the latter position until such stroke is completed, and then shifts the bar back to its original position again in readiness for a second stroke in the original direction. These operations are repeated during each cycle. Thus the entire area of the skin or other article of work being measured is scanned but no portion of the work is scanned twice.

Lamp changer

As a further means for ensuring the reliability of the machine, provision may be made for automatically replacing the electric lamp 8 in the event that the lamp burns out. A suitable apparatus for this purpose is illustrated in Fig. 22. It comprises a turn table 180 carrying a series of sockets 181, 182 and 183, each adapted to receive an electric lamp. One of these lamps, as for example that in the socket 181, is in scanning position, current being supplied to it through suitable connections with a commutator 184 to which the other lamps also are connected by brushes 185 and 186 bearing on the commutator and connected with any suitable source of current. A coiled spring 189 acts on the turn table shaft with a constant tendency to revolve the turn table in the direction indicated by the arrow, but normally such rotation is prevented by the engagement of a pawl 187 with any one of a series of stops 188. Connected to the pawl is an armature 190 located in the field of an electro-magnet 191 which is included in the circuit of the lamp in working position. Consequently, so long as current flows through the lamp the solenoid 191 remains energized and holds the pawl in its operative position, but if the filament of the lamp should burn out, the solenoid immediately becomes deenergized, whereupon the spring 192 swings the pawl outwardly, thus allowing the turn table to revolve far enough to bring the lamp in the socket 183 into working position. The arrival of the lamp in this location automatically completes the circuit through the solenoid 191 again, thus restoring the pawl 187 to its initial position and causing it to stop the turn table when it has made a third of a revolution. Any other suitable form of automatic lamp changer may be substituted for that shown.

*Volume measurement*

As above indicated, an important field of usefulness for this machine is in the lumber industry. Here the measurement of the work involves not only the determination of the surface area, but the multiplication of that area by the thickness of the board or timber in order to obtain the board measure. In other words, board measure is primarily volume measurement instead of simply one of surface area.

A convenient method of accomplishing this result is illustrated in Figs. 23 and 24. It comprises a change gear mechanism interposed between the feed roll shaft 35 and the counter driving shaft 34 so that the ratio between the rate of feed of the work and the speed at which the integrating mechanism is driven can be adjusted at will. As best shown in Fig. 23, a series of gears 193, all secured fast on the shaft 194, is arranged to be driven continuously by the gear 35' on the end of the feed roll shaft 35. The driven gear 39, instead of being mounted on the end of the shaft 34, is connected to said shaft through a pair of universal joints and an intermediate link 195, and is mounted on a swinging arm or segment 196 pivoted on a stationary frame member at 197. It has a splined connection with its shaft so that it can be adjusted axially thereof and held in its adjusted position by means of a screw 198. With this arrangement, therefore, the driven gear 39 can be adjusted to mesh with any one of the gears 193. The bolt 199 secures the parts in their adjusted relationship.

Thus this mechanism may be utilized to multiply the results of the integrating operation by any one of a series of values selected to suit the requirements of an individual run of work, and thus to convert the area measurement into one of volume. Such an arrangement is particularly useful in measuring lumber because of the trade custom of billing certain planed lumbers with a percentage added to the actual width or thickness of the planed pieces to compensate for the volume of wood removed in the planing operation. The gearing may be so selected as to make this computation automatically. In using the machine to measure lumber, the fact that the pieces can be numbered and both the number and the board measure of the respective pieces printed automatically on them and a printed record for office purposes made simultaneously, effects a substantial saving in labor while being more accurate than the survey made by hand.

The present application is a continuation, in part, of pending application Serial No. 755,002, filed November 27, 1934, which has become Patent No. 2,184,157 for improvements in Area measuring machines, and the various modifications illustrated and described in said earlier application may be used in connection with one or more of the machines shown in this application.

It may here be pointed out that photo-cells are essentially electrical detectors of radiation. Various such detectors are known in addition to those specifically mentioned above, such for example, as bolometers, Photronic cells, and radiation thermo-electric devices. Those radiation detectors suitable for use in methods or machines embodying this invention, are herein included in the term "photo-cells." Also, the radiations used are not confined to visible light rays but may be near infrared, near ultraviolet, and possibly soft X-rays and certain radiation from radioactive substances. Those radiations suitable for use in these machines are here included in the term "light."

It will be evident from the foregoing that the invention provides machines capable of handling a wide variety of work including not only hides, skins, lumber, and the like, but smaller articles such as shoe patterns, and the various irregular surfaces and charts produced in scientific and research work, the areas of which must be determined wtih a high degree of accuracy. For all of these purposes the machine effects an important saving in labor, and produces more accurate results.

While typical embodiments of the invention have been herein illustrated and described, it will be evident from the foregoing that such illustration and description have been made rather by way of explanation than limitation, and that the invention may be embodied in a great variety of other forms without departing from the spirit or scope thereof.

Having thus described our invention, what we desire to claim as new is:

1. In an area measuring machine, scanning beam-producing means, means reciprocating said beam-producing means so that said scanning beam reciprocates across an element whose area is to be measured, means feeding said element at a predetermined speed with respect to the velocity of traverse of said beam-producing means and at approximately right angles to the direction of movement of said beam-producing means, said feeding means including means operable at the end of each stroke of the beam-producing means to move the beam-producing means against the direction of feed of the element by a distance substantially equal to the feed of the element during such stroke, whereby the beam scans successive parallel contiguous increments on the element, and means controlled by said scanning means for automatically integrating said scanned increments.

2. In a machine for measuring the area of a surface of an article of work, means moving a scanning beam along a predetermined path, means feeding the work through said scanning beam transversely to said path, said first and second means cooperating to cause said beam to scan the desired area of the work, means under the control of said scanning operation for integrating the scanned increments of area, and means adjustable at will to change the ratio between the rate of feed of the work and the operation of said integrating mechanism.

3. In a machine for measuring the area of a surface of an article of work, means moving a scanning beam along a predetermined path, means feeding the work through said scanning beam transversely to said path, said first and second means cooperating to cause said beam to scan the desired area of the work, means under the control of said scanning operation for integrating the scanned increments of area, and means multiplying the results of said integrating operation by any one of a plurality of values, selectable at will, to convert the area measurement into one of volume.

4. In a machine for measuring areas, a plurality of sources of radiation, means defining a scanning beam from one of said sources against the surface to be measured, means operative upon the failure of said one source to move another source into operative relationship with said beam-defining means, means moving said beam to scan successive increments of said surface, and means integrating said increments into an area measurement of said surface.

5. In a machine for measuring the area of a surface, means, including a source of a scanning beam, for scanning successive increments of said surface until the entire surface has been so scanned, means responsive to said beam mounted in position to receive the scanning beam when not intercepted by said surface, an electric circuit including said last-named means and an alternating-current amplifier for the power output thereof, and means including a synchronous motor driven from said circuit for integrating the scanned increments.

6. In a machine for measuring the area of a surface, means including a source of a scanning beam, for scanning successive increments of said surface until the entire surface has been so scanned, a light-chopper interrupting said scanning beam, means responsive to said beam mounted in position to receive the scanning beam when not intercepted by said surface, an electric circuit including said last-named means and an alternating-current amplified for the power output thereof, and means controlled by said circuit for integrating the scanned increments.

7. In a measuring machine, means, including a source of a scanning beam, for scanning successive increments of the surface of an article to be measured until the entire surface has been so scanned, means responsive to said beam mounted in position to receive the scanning beam when it is not intercepted by said surface, an electric circuit including said last-named means, means controlled by said circuit for integrating the areas of the scanned increments, and means changing the rate of area integration with respect to the rate of scanning of area increments of said surface, said change being proportional to the thickness of said article, whereby the integrated result indicates the volume of the article.

8. In a machine for measuring the area of a surface, the combination of means for scanning successive increments of said surface, means controlled by the scanning means for automatically integrating said increments and thereby giving the measurement of the scanned area, and means for warning the operator when a predetermined area has been integrated.

9. In a machine for measuring the area of a surface of an article of work, means moving a scanning beam along a predetermined path, means feeding the work through said scanning beam transversely to said path, said first and second means cooperating to cause said beam to scan the desired area of the work, means controlled by said scanning operation for integrating the scanned increments of area and indicating the result, and means for warning the operator when a predetermined piece number has been reached.

10. The method of measuring comprising relatively moving a scanning beam and an article is to be measured to scan successive area increments of a surface of said article, integrating the scanned increments, and so controlling the rate of integration with respect to the rate of scanning of the area increments of the surface of the article that the integrated result will give a measure of the volume of the scanned portion of the article.

11. Measuring apparatus comprising means producing a scanning beam, means relatively moving said scanning beam and an article to be measured to scan successive area increments of a surface of said article, means integrating the scanned increments, and means controlling the rate of integration with respect to the rate of scanning of the area increments of the surface of the article so that the integrated result will give a measure of the volume of the scanned portion of the article.

ERNEST C. WHITNEY.
JOHN L. JONES.